(12) United States Patent
Yuan et al.

(10) Patent No.: US 10,481,009 B2
(45) Date of Patent: Nov. 19, 2019

(54) TEMPERATURE PROBE AND TEMPERATURE MEASURING DEVICE

(71) Applicant: BOE TECHNOLOGY GROUP CO., LTD., Beijing (CN)

(72) Inventors: Zuo Yuan, Beijing (CN); Ruisi Chen, Beijing (CN); Pan Ni, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 177 days.

(21) Appl. No.: 15/529,204

(22) PCT Filed: Jan. 29, 2016

(86) PCT No.: PCT/CN2016/072706
§ 371 (c)(1),
(2) Date: May 24, 2017

(87) PCT Pub. No.: WO2017/041421
PCT Pub. Date: Mar. 16, 2017

(65) Prior Publication Data
US 2017/0328780 A1    Nov. 16, 2017

(30) Foreign Application Priority Data
Sep. 10, 2015   (CN) .......................... 2015 1 0575156

(51) Int. Cl.
*G01K 1/02*        (2006.01)
*G01K 7/22*        (2006.01)

(52) U.S. Cl.
CPC ............... *G01K 1/024* (2013.01); *G01K 7/22* (2013.01); *G01K 2215/00* (2013.01)

(58) Field of Classification Search
CPC .................................................... G01K 1/024
See application file for complete search history.

(56) References Cited

U.S. PATENT DOCUMENTS 6,185,442 B1 *   2/2001   Samson ............. A61B 5/04485
                                                    600/376
7,532,120 B2     5/2009   Estevez et al.
(Continued)

FOREIGN PATENT DOCUMENTS

CN         202159352 U     3/2012
CN         202282053 U     6/2012
(Continued)

OTHER PUBLICATIONS

Sample et al, "Design of an RFID-Based Battery-Free Programmable Sensing Platform." IEEE Transactions on Instrumentation and Measurement 57, No. 11 (Nov. 2008): 2608-615. doi:10.1109/tim.2008.925019. (Year: 2008).*
(Continued)

*Primary Examiner* — Clayton E. LaBalle
*Assistant Examiner* — Leon W Rhodes, Jr.
(74) *Attorney, Agent, or Firm* — Collard & Roe, P.C.

(57) ABSTRACT

A temperature probe includes: an antenna, a coupling element, a radio frequency identification (RFID) chip and a temperature measuring circuit. The antenna is connected to a capacitor in the coupling element to form a resonant loop, and is configured to sense an electromagnetic wave emitted by a reader and a store harvested energy in the capacitor to supply power to the RFID chip. The RFID chip is connected to the antenna and the coupling element, and is configured to send stored electronic tag information to the reader via the antenna. The temperature measuring circuit is connected to the RFID chip, and is configured to detect temperature information of an object and to send the temperature information to the reader via the antenna. Also provided is a temperature measuring device. The temperature probe and the temperature measuring device do not require a battery, are small-sized, and have a long service life.

19 Claims, 3 Drawing Sheets

(56) References Cited

U.S. PATENT DOCUMENTS

| | | |
|---|---|---|
| 8,258,928 B2 | 9/2012 | Tseng |
| 9,082,545 B2 | 7/2015 | Sugita et al. |
| 2005/0226310 A1* | 10/2005 | Nakazawa ............. G01K 1/024 |
| | | 374/208 |

FOREIGN PATENT DOCUMENTS

| | | | |
|---|---|---|---|
| CN | 102592165 | A | 7/2012 |
| CN | 102831457 | A | 12/2012 |
| CN | 102971908 | A | 3/2013 |
| CN | 103310269 | A | 9/2013 |
| CN | 103714356 | A | 4/2014 |
| CN | 104198080 | A | 12/2014 |
| CN | 204405226 | U | 6/2015 |
| CN | 105067141 | A | 11/2015 |
| CN | 204924483 | U | 12/2015 |
| JP | 2008113913 | A * | 5/2008 |

OTHER PUBLICATIONS

International Search Report of PCT/CN2016/072706 in Chinese, dated Jun. 7, 2016 with English translation.
Notice of Transmittal of the International Search Report of PCT/CN2016/072706 in Chinese, dated Jun. 7, 2016.
Written Opinion of the International Searching Authority of PCT/CN2016/072706 in Chinese, dated Jun. 7, 2016 with English translation.
Chinese Office Action in Chinese Application No. 201510575156.7, dated Mar. 20, 2017 with English translation.
Second Chinese Office Action in Chinese Application No. 201510575156.7, dated Sep. 30, 2017 with English translation.

* cited by examiner

000
TEMPERATURE PROBE AND TEMPERATURE MEASURING DEVICE

CROSS REFERENCE TO RELATED APPLICATIONS

This application is the National Stage of PCT/CN2016/072706 filed on Jan. 29, 2016, which claims priority under 35 U.S.C. § 119 of Chinese Application No. 201510575156.7 filed on Sep. 10, 2015, the disclosure of which is incorporated by reference.

TECHNICAL FIELD

Embodiments of the present disclosure relate to a temperature probe and a temperature measuring device.

BACKGROUND

Temperature is a physical characteristic that represents the hot and cold degree of an object, and is a parameter commonly used in production and daily life and needs to be measured. At present, the mostly used temperature measurement tools mainly comprise a conventional mercury thermometer, an infrared thermometer and an electronic thermometer based on a temperature sensor. The mercury thermometer is inconvenient to use and is unsafe. The infrared thermometer is bulky and do not have data management functions. The conventional electronic thermometer is also bulky, requires a battery to supply power, and has a short service life. There is an urgent demand for a temperature measuring device which is small in volume, safe and convenient to use and enables temperature data transmission and management.

SUMMARY

At least one embodiment of the present disclosure provides a temperature probe and a temperature measuring device, which requires no battery and has a small size, have a long service life and is safe to use, and enables temperature data transmission and management.

At least one embodiment of the present disclosure provides a temperature probe, comprising an antenna, a coupling element, an RF identification chip and a temperature measuring circuit, the antenna connected to a capacitor of the coupling element so as to form a resonance circuit and configured to sense electromagnetic wave emitted from a reader and store energy acquired in the capacitor so as to supply power to the RF identification chip, the RF identification chip connected to the antenna and to the coupling element and configured to transmit information of a stored tag to the reader through the antenna, the temperature measuring element connected to the RF identification chip and configured to detect information of temperature of an object under test and to transmit the information to the reader through the antenna.

According to one embodiment of the present disclosure, the temperature probe is a closed body in which the antenna, the coupling element, the RF identification chip and the temperature measuring circuit are embedded.

According to one embodiment of the present disclosure, one side of the closed body is a detection face, the temperature measuring circuit comprises a temperature sensor, and the temperature sensor is exposed from the detection face or the temperature sensor is not exposed but the temperature sensor can detect the temperature of the object under test through the detection face.

According to one embodiment of the present disclosure, the temperature sensor is disposed at a center of the detection face, a thermal insulation layer is disposed around the temperature sensor, a suction disc is formed at a periphery of the thermal insulation layer and is configured to provide a stable suction force to make the temperature probe adhered to the object under test.

According to one embodiment of the present disclosure, a profile of the closed body is a flat body with a circular or an elliptical shape.

According to one embodiment of the present disclosure, the RF identification chip comprises a memory and a processor.

According to one embodiment of the present disclosure, the temperature sensor is a thermistor sensor.

According to one embodiment of the present disclosure, the thermistor sensor is a thermistor with negative temperature coefficient.

At least one embodiment of the present disclosure provide a temperature measuring device comprising one or more temperature probe(s) as mentioned above.

According to one embodiment of the present disclosure, the temperature measuring device further comprises a reader configured to provide energy for the respective temperature probes through the antenna and to read the temperature information.

According to one embodiment of the present disclosure, the reader comprises a plurality of operating periods, each of which includes a working period and an idle period; upon being in the working period, the reader provides energy for the temperature probe and reads the temperature information.

According to one embodiment of the present disclosure, the reader comprise an RF read and write module configured to read the temperature information in the temperature probe; an RF control module configured to control the antenna and the coupling element to provide energy for the temperature probe and to control the RF read and write module to read the temperature information; the antenna and the coupling element configured to transmit and receive electromagnetic waves; and a power supply module configured to supply power to the respective modules of the reader.

According to one embodiment of the present disclosure, the reader further comprises a communication module configured to send the read temperature information to a smartphone or a computer.

According to one embodiment of the present disclosure, the communication module is further configured to receive information from the smartphone or the computer.

According to one embodiment of the present disclosure, the communication module is a Bluetooth module.

The temperature probe according to the embodiments of the present disclosure comprises an antenna, a coupling element, an RF identification chip and a temperature measuring circuit; the antenna connected with a capacitor in the coupling element, thereby forming a resonant circuit which is configured to sense electromagnetic waves transmitted from a reader and store collected energy in the capacitor to supply power to the RF identification chip; the RF identification chip connected with the antenna and the coupling element, and configured to send electronic tag information stored therein to the reader through the antenna; and the temperature measuring circuit connected with the RF identification chip, and configured to detect temperature information of an object and send the detected temperature information to the RF identification chip through the antenna. The temperature probe can be operated without a battery. And the temperature probe can be made into a completely closed structure which has a small size and a long life, is safe and convenient to use, and enables the temperature data transmission and management.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

REFERENCE NUMERALS

10—temperature probe, 11—antenna, 12—coupling element, 13—RF identification chip, 14—temperature measuring circuit, 141—temperature sensor, 15—thermal insulation layer, 16—suction disc, 20—reader, 21—antenna II, 22—coupling element II, 23—RF read and write module, 24—control module, 25—communication module, 26—power supply module.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
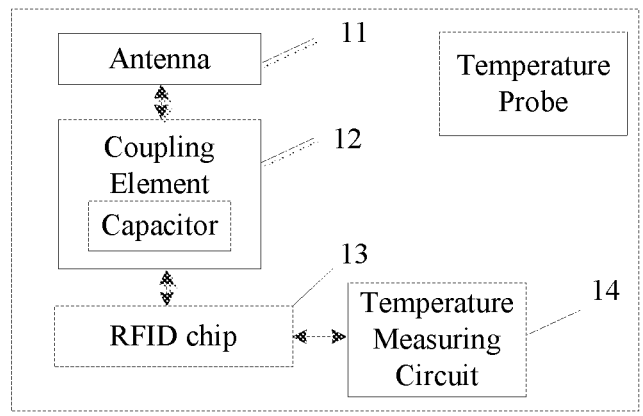
FIG. 1 is a structural block diagram of a temperature probe according to one embodiment of the present disclosure.

At least one embodiment of the present disclosure provides a temperature probe. As illustrated in FIG. 1, the temperature probe 10 comprises an antenna 11, a coupling element 12, an RF identification chip 13 and a temperature measuring circuit 14. The antenna 11 is connected with a capacitor in the coupling element 12, thereby forming a resonant circuit which is configured to sense electromagnetic waves emitted from the reader and store collected energy in the capacitor so as to supply power to the RF identification chip 13. The RF identification chip 13 is connected with the antenna 11 and the coupling element 12, and is configured to send information of electronic tag stored therein to the reader through the antenna 11. The temperature measuring circuit 14 is connected with the RF identification chip 13, and is configured to detect temperature information of an object and send it to the reader through the antenna 11.

The RF identification technology is a mature and effective near field communication technology. An RF identification system is typically comprised of an electronic tag and a reader. An electronic tag is classified into an active type and a passive type. A passive electronic tag (a passive tag) has advantages of having a small size and requiring no power supply. The passive electronic tag has no built-in battery. The electronic tag is in a passive state when being beyond the readable range of the reader, while the electronic tag extracts the power required for its operation from RF energy emitted by the reader when being within the readable range of the reader. The passive electronic tag usually achieves the transmission of the electronic tag information to the reader by use of reflection modulation mode. In general, when the passive electronic tag receives a signal strong enough, it can send data to the reader. The data not only include the label number (globally unique ID), but also can comprise data pre-stored in the memory (EEPROM) within the tag.

In the embodiments of the present disclosure, the temperature measuring circuit 14 is integrated in a passive tag to form a temperature probe, to which the reader supplies power and from which the reader extracts the temperature information, thereby achieving the temperature measurement and the temperature data transmission by the cooperation therebetween. The reader can further transmit data to a smartphone or a computer so as to achieve an intelligent measurement and management of the temperature.

The temperature probe according to the embodiments of the present disclosure is an integration of a passive electronic tag and a temperature sensor and is mainly configured to carry out a precise measurement on temperature. The temperature probe mainly comprises the antenna 11, the coupling element 12, the RF identification chip 13 and the temperature measuring circuit 14. The antenna 11 and the coupling element 12 cooperate with each other to achieve two functions. One function is to extract power required for the operation of the temperature probe from RF energy emitted from the reader. The other function is to send and receive information at the temperature probe. The RF identification chip 13 comprises a memory and a processor and is configured to process information and control operations of the modules such as the antenna 11, the coupling element 12 and the temperature measuring circuit 14. For example, the RF identification chip 13 is configured to control the temperature measuring circuit 14 to perform the temperature measurement and store the data in the memory and then send the temperature information through the antenna.

In the embodiments of the present disclosure, the temperature measuring circuit 14 is integrated into the passive tag to form the temperature probe, and without a battery, the passive electronic tag is supplied with power through sensing the electromagnetic wave emitted by the reader and performs data transmission. Thus, the temperature probe can be made into a completely closed structure which has a small size and a long life, is safe and convenient to use, and enables the temperature data transmission and management.

Figure 2:
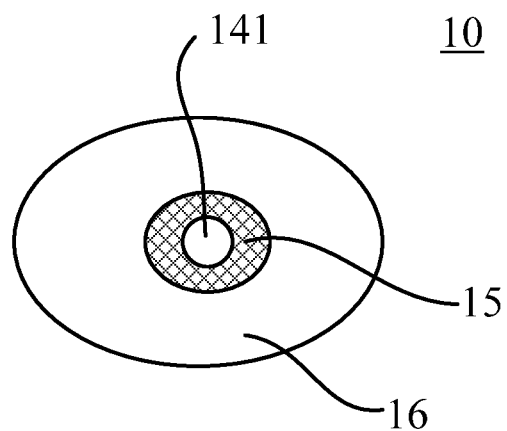
FIG. 2 is an outline diagram of a temperature probe according to one embodiment of the present disclosure.

FIG. 2 illustrates a temperature probe 10 according to one embodiment of the present disclosure. The temperature probe 10 is a closed body in which the antenna, the coupling element, the RF identification chip and the temperature measuring circuit are embedded. The temperature probe 10 is a closed body as a whole, and is waterproof and insulated, and can protect devices and circuits disposed therein, and is safe and convenient to use. The service life of the temperature probe 10 is prolonged.

The profile of the above-described closed body can be a flat body with a circular or an elliptical shape, with one side acting as a detection face 100. The temperature sensor 141 in the temperature measuring circuit is disposed at the center of the detection face. A thermal insulation layer 15 is disposed around the temperature sensor 141. A suction disc 16 is formed at the periphery of the thermal insulation layer 15. The thermal insulation layer 15 reduces an influence of the ambient temperature on the temperature sensor 141. The suction disc 16 is configured to provide a stable suction force to make the temperature probe 10 adhered to the object under test for easy measurement. The temperature sensor 141 can precisely sense the temperature with a surface which is exposed from the detection face. Or alternatively, the temperature sensor 141 may not be exposed, and can detect the temperature of the object under test through the detection face. In this case, the detection face at the temperature sensor 141 is a thin layer of protective material which allows heat transfer.

Figure 3:
FIG. 3 is a schematic view of a temperature sensor according to one embodiment of the present disclosure.

Optionally, the temperature sensor 141 is a thermistor sensor. The resistance of the thermistor sensor changes with temperature. For example, the resistance of a thermistor with a negative temperature coefficient (NTC, Negative Temperature Coefficient) decreases exponentially with the increase of temperature. The resistance changes and the current changes accordingly. The changes in temperature can be reflected by detecting the changes of current. The thermistor sensor is usually made by ceramic technology and has a small size. As a contact thermistor sensor applicable to a thermometer, a flexible cable NTC thermistor is selected. The main temperature sensing portion of the temperature sensor 141 has a diameter of about 1 mm, the length of the flexible lead is 25 to 50 mm, and the precision is generally required to be at least 0.1° C., as illustrated in FIG. 3. The main temperature sensing portion of the temperature sensor 141 is disposed on the detection face, and the flexible lead is connected with the RF identification chip 13.

The temperature probe according to the present disclosure is used in cooperation with a reader. The operational principle is that the reader sends radio wave energy of a specific frequency to the temperature probe to drive the circuit of the temperature probe to send the internal information in form of code, which will be received by the reader. The information in form of code contains temperature information. The temperature probe has a characteristic of being free of battery, the temperature information being read without contact, a completely closed structure, being safe and convenient to use and being hard to be contaminated.

At least one embodiment of the present disclosure provides a temperature measuring device, comprising one or more temperature probe as described above. When the temperature measuring device comprises two temperature probes, temperatures of different users can be detected and each temperature probe correspondingly detects the body temperature of one user. Thus, when body temperatures of different users are detected by one temperature measuring device, it is convenient to manage the body temperature information.

The temperature measuring device according to the embodiments of the present disclosure comprises the above-described temperature probe. An intelligent temperature measuring device (such as a thermometer) which is small and easy to use can be achieved and is widely used in home, hospital and etc.

Figure 4:
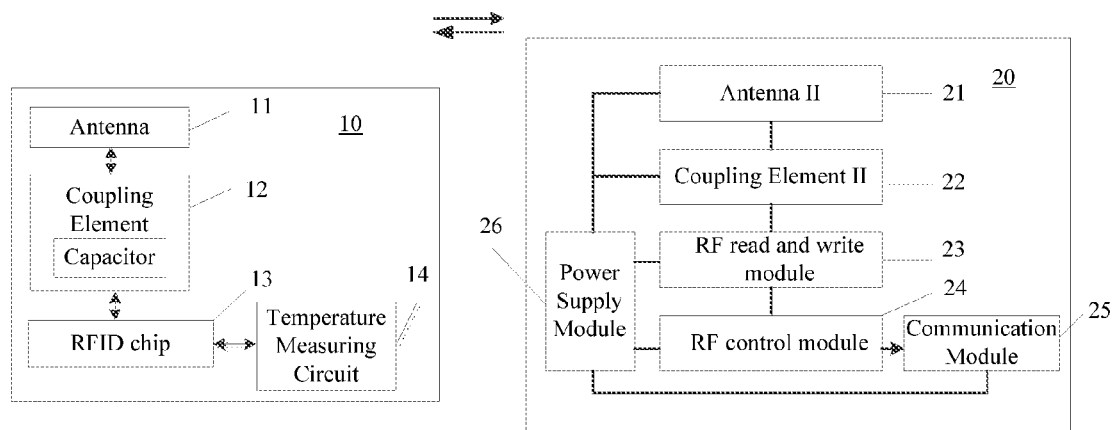
FIG. 4 is a structural diagram of a temperature measuring device according to another embodiment of the present disclosure.

Further, as illustrated in FIG. 4, the temperature measuring device according to one embodiment of the present disclosure further comprises a reader 20 which is configured to provide energy for the respective temperature probes 10 through the antenna 21 and to read the temperature information. The reader 20 comprises an RF read and write module 23, which is configured to read the temperature information in the temperature probe 10 by the antenna II 21; an RF control module 24, which is configured, according to instructions, to control the antenna II 21 and the coupling element II 22 to provide energy for the temperature probe 10 and to control the RF read and write module 23 to read the temperature information; an antenna 11 and a coupling element, which are configured to transmit and receive the electromagnetic waves; a power supply module 26, which is configured to supply power to the respective modules (21 to 25) of the reader 20.

The temperature measuring device according to the embodiments of the present disclosure comprises the temperature probe and the reader 20 which carry out temperature measurement and data reading by cooperating with each other. Thus, an intelligent temperature measuring device (such as a thermometer) which is small and easy to use can be achieved and is widely used in home, hospital and etc.

In one embodiment of the present disclosure, the reader 20 can further comprise a communication module 25, which is configured to send the read temperature information of a certain user detected by each temperature probe 10 to the smartphone or the computer. The smartphone or the computer can be connected to various temperature probes 10 and store and display all of the temperature data measured by the temperature probes 10 as required. The communication module 25 can be also configured to receive instructions from the smartphone or the computer. The aforementioned communication module 25 can be a wireless or wired communication module. The wireless communication module is for example a Bluetooth module, a near field communication module or the like.

During use, the reader and the passive temperature probe can be kept in a periodic working condition. That is to say, the reader 20 periodically detects the temperature sensor on the temperature probe 10, thereby reducing power consumption. For example, the reader 20 can be operated in a plurality of operating periods, each of which includes a working period and an idle period. When being in the working period, the reader 20 provides energy for the temperature probe 10 and reads the temperature information. When being is in the idle period, the reader 20 does not transmit electromagnetic waves, and the temperature probe 10 cannot be supplied with power and thus is in a suspended state until activated by the reader 20 in the next time.

Figure 5:
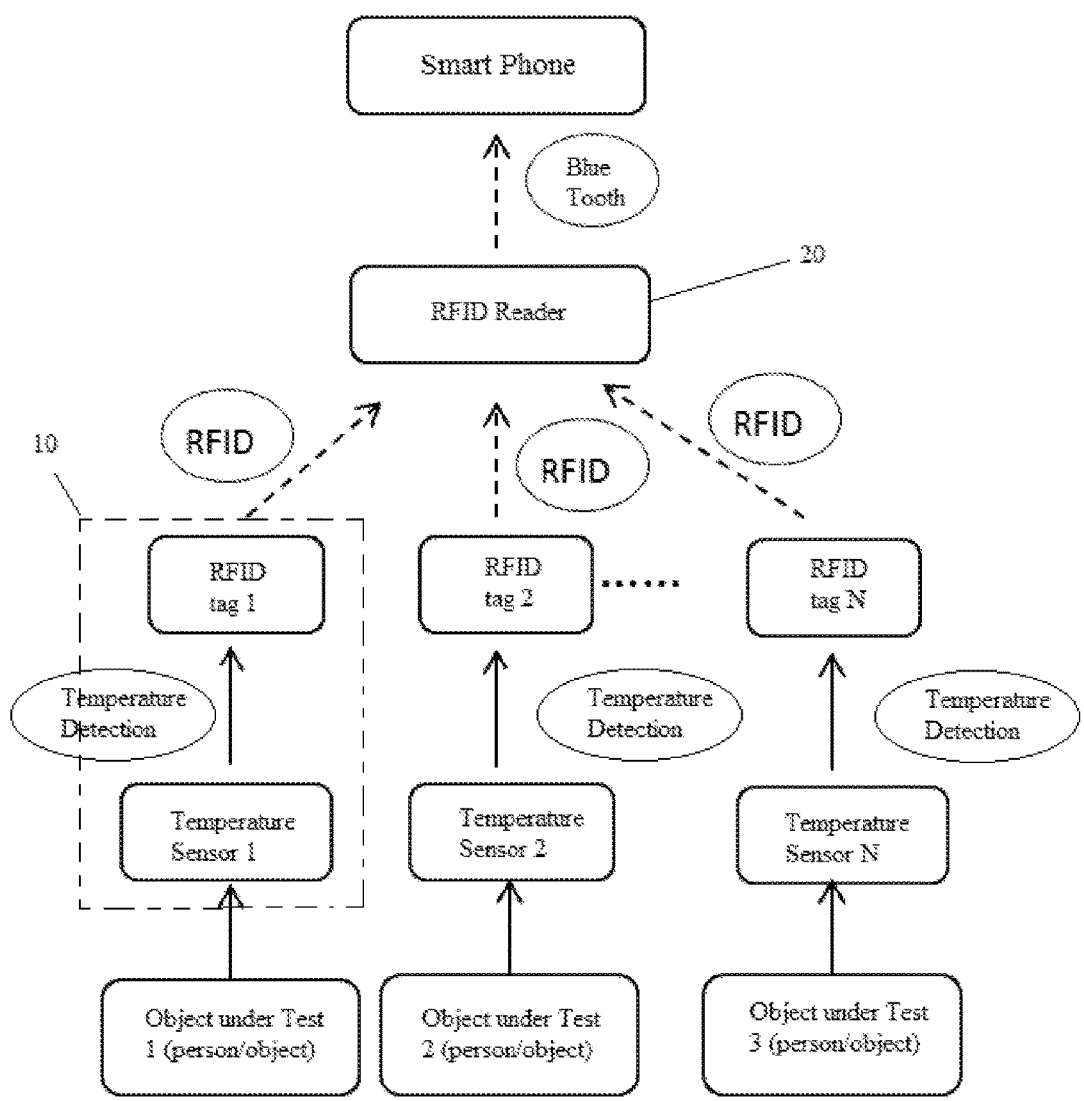
FIG. 5 is an operational diagram of a temperature measuring device according to one embodiment of the present disclosure.

FIG. 5 illustrates a working diagram of an RFID-based temperature measuring device (RF thermometer) according to one embodiment of the present disclosure. The temperature measuring device comprises a temperature probe 10 and a reader 20. The temperature probe 10 is formed by integrating an RFID tag and a temperature sensor. An effective connection distance between the reader 20 and the temperature probe 10 is no less than 5 meters. In the operation state, the reader 20 activates the temperature probe 10 and the temperature sensor in the temperature probe 10 acquires temperature information of the person/object under test and sends it to the reader 20 in form of electronic tag information. The Bluetooth module of the reader 20 actively sends temperature data information to the smartphone (or a computer or other intelligent components). After receiving the data, the smartphone performs management of the data and information. Head of package of the temperature data sent by each temperature probe 10 contains an identification code of the tag. When the data is transmitted, all the temperature data in one day can be sent at each time. The smartphone can be connected with different temperature probes 10 at different times (or can be connected with different temperature probes 10 at the same time), and store and display all the temperature data measured by the temperature probe 10 in one day. In the smartphone terminal, intelligent temperature measurement and management can be achieved through a program.

The embodiments according to the present disclosure carry out the temperature measurement by integrating the temperature sensor 141 into the passive electronic tag and finally transmit the data to the smartphone or the computer by RF or Bluetooth and perform the temperature data management. The temperature measurement end is a passive and completely closed temperature probe, which has a small size and a long service life, is safe and convenient to use, and enables the temperature data transmission and management.

It can be appreciated by one of ordinary skills in the art that the reader 20 in the present embodiment can also be directly disposed (or integrated) in the smartphone or the computer.

Each of the embodiments in this specification is described in a progressive manner. The same and similar portions of the various embodiments can be cross-referenced. Each embodiment is illustrated with a focus on the differences from other embodiments. In particular, for the device embodiment, since it is substantially similar to the method embodiment, the description thereof is relatively simple and the relevant portions described in the method embodiment can be referred to.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201510575156.7 filed on Sep. 10, 2015, the disclosure of which is hereby entirely incorporated by reference as a part of the present disclosure.

The invention claimed is:

1. A temperature probe, comprising an antenna, a coupling element, an RF identification chip and a temperature measuring circuit;
   the antenna connected with a capacitor in the coupling element, thereby forming a resonant circuit which is configured to sense electromagnetic waves transmitted from a reader and store collected energy in the capacitor to supply power to the RF identification chip;
   the RF identification chip connected with the antenna and the coupling element, and configured to send electronic tag information stored therein to the reader through the antenna; and
   the temperature measuring circuit connected with the RF identification chip, and configured to detect temperature information of an object and send the detected temperature information to the RF identification chip which is configured to send the detected temperature information to the reader through the antenna;
   wherein the temperature probe is a closed body, one side of the closed body is a detection face, the temperature measuring circuit comprises a temperature sensor, and
   wherein the temperature sensor is disposed at a center of the detection face, a thermal insulation layer is disposed around the temperature sensor, a suction disc is formed at a periphery of the thermal insulation layer, and the suction disc is configured to provide a stable suction force to make the temperature probe adhered to the object under test.

2. The temperature probe according to claim 1, wherein the temperature probe is a closed body in which the antenna, the coupling element, the RF identification chip and the temperature measuring circuit are embedded.

3. The temperature probe according to claim 2, wherein the temperature sensor is exposed from the detection face or the temperature sensor is not exposed but the temperature sensor can detect the temperature of the object under test through the detection face.

4. The temperature probe according to claim 3, wherein the temperature sensor is a thermistor sensor.

5. The temperature probe according to claim 4, wherein the thermistor sensor is a thermistor with negative temperature coefficient.

6. The temperature probe according to claim 3, wherein a profile of the closed body is a flat body with a circular or an elliptical shape.

7. The temperature probe according to claim 3, wherein the RF identification chip comprises a memory and a processor.

8. The temperature probe according to claim 2, wherein a profile of the closed body is a flat body with a circular or an elliptical shape.

9. The temperature probe according to claim 2, wherein the RF identification chip comprises a memory and a processor.

10. The temperature probe according to claim 1, wherein the RF identification chip comprises a memory and a processor.

11. The temperature probe according to claim 1, wherein a profile of the closed body is a flat body with a circular or an elliptical shape.

12. The temperature probe according to claim 1, wherein the temperature sensor is a thermistor sensor.

13. A temperature measuring device, comprising one or more temperature probe(s) according to claim 1.

14. The temperature measuring device according to claim 13, further comprising:
   a reader configured to provide energy for the respective temperature probes through the antenna and to read the temperature information.

15. The temperature measuring device according to claim 14, wherein the reader comprises a plurality of operating periods, each of which includes a working period and an idle period;
   upon being in the working period, the reader provides energy for the temperature probe and reads the temperature information.

16. The temperature measuring device according to claim 14, wherein the reader comprises:
   an RF read and write module configured to read the temperature information in the temperature probe;
   an RF control module configured to control the antenna and the coupling element to provide energy for the temperature probe and to control the RF read and write module to read the temperature information;
   an antenna configured to transmit and receive electromagnetic waves; and
   a power supply module configured to supply power to the respective modules of the reader.

17. The temperature measuring device according to claim 16, wherein the reader further comprises a communication module configured to send the read temperature information to a smartphone or a computer.

18. The temperature measuring device according to claim 17, wherein the communication module is further configured to receive information from the smartphone or the computer.

19. The temperature measuring device according to claim 18, wherein the communication module is a Bluetooth module.

\* \* \* \* \*